United States Patent
Kehren et al.

(10) Patent No.: US 11,920,102 B2
(45) Date of Patent: *Mar. 5, 2024

(54) DEPOSITION COMPOSITIONS AND METHODS OF MAKING AND USING SAME

(71) Applicant: 3M INNOVATIVE PROPERTIES COMPANY, St. Paul, MN (US)

(72) Inventors: Jason M. Kehren, Stillwater, MN (US); David J. Lundberg, Cottage Grove, MN (US); Zai-Ming Qiu, Woodbury, MN (US); Michael G. Costello, Afton, MN (US); Michael J. Bulinski, Stillwater, MN (US); Alexandre R. Monteil, St. Paul, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/795,387

(22) PCT Filed: Jan. 21, 2021

(86) PCT No.: PCT/IB2021/050463
§ 371 (c)(1),
(2) Date: Jul. 26, 2022

(87) PCT Pub. No.: WO2021/152432
PCT Pub. Date: Aug. 5, 2021

(65) Prior Publication Data
US 2023/0056641 A1    Feb. 23, 2023

Related U.S. Application Data

(60) Provisional application No. 62/967,057, filed on Jan. 29, 2020.

(51) Int. Cl.

| | | |
|---|---|---|
| *C10M 107/38* | (2006.01) | |
| *C08K 5/372* | (2006.01) | |
| *C10M 135/08* | (2006.01) | |
| *C10M 135/22* | (2006.01) | |
| *C10M 169/04* | (2006.01) | |
| *C10N 20/00* | (2006.01) | |
| *C10N 20/02* | (2006.01) | |
| *C10N 40/18* | (2006.01) | |

(52) U.S. Cl.
CPC ........... *C10M 107/38* (2013.01); *C08K 5/372* (2013.01); *C10M 135/08* (2013.01); *C10M 135/22* (2013.01); *C10M 169/04* (2013.01); *C10M 2213/0606* (2013.01); *C10M 2219/04* (2013.01); *C10M 2219/082* (2013.01); *C10N 2020/017* (2020.05); *C10N 2020/02* (2013.01); *C10N 2040/18* (2013.01)

(58) Field of Classification Search
CPC .............. C10M 107/38; C10M 135/08; C10M 135/22; C10M 169/04; C10M 2213/0606; C10M 2219/04; C10M 2219/082; C10N 2020/017; C10N 2020/02; C10N 2040/18; C09D 5/00; C08K 5/372
See application file for complete search history.

(56) References Cited

U.S. PATENT DOCUMENTS

| | | | | |
|---|---|---|---|---|
| 3,048,569 A | * | 8/1962 | Harris, Jr. | ............... C08F 28/00 526/243 |
| 3,073,844 A | * | 1/1963 | Krespan | ............... C07D 339/08 570/135 |
| 3,476,811 A | * | 11/1969 | Terrell | .................. C07C 323/00 252/364 |
| 3,476,812 A | | 11/1969 | Terrell | |
| 3,749,794 A | | 7/1973 | Terrell | |
| 3,816,277 A | * | 6/1974 | Haszeldine | ........... C07C 309/00 204/157.8 |
| 5,049,410 A | | 9/1991 | Johary et al. | |
| 5,914,298 A | * | 6/1999 | Karydas | ................. A63C 5/056 280/610 |
| 6,403,149 B1 | | 6/2002 | Parent et al. | |
| 7,691,282 B2 | | 4/2010 | Flynn et al. | |
| 2006/0163532 A1 | * | 7/2006 | D'Aprile | ............ C10M 169/044 252/182.11 |

FOREIGN PATENT DOCUMENTS

| | | |
|---|---|---|
| JP | 2012087092 A | 5/2012 |
| WO | 96/22356 | 7/1996 |
| WO | 2020229953 A1 | 11/2020 |

OTHER PUBLICATIONS

Anello, L.G., Van Der Puy, M., "A Convenient Synthesis of Hexafluoroacetone", J. Org. Chem. 1982, 47, 377-378 (Year: 1982).*
Anello, "A convenient synthesis of hexafluoroacetone", Journal of Organic Chemistry, Jan. 1982, vol. 47, No. 2, pp. 377-378.
Haley, "Perfluoroalkyl derivatives of sulphur. Part XVIII. Reactions of polyfluoroiodoalkanes with sodium methanethiolate in the presence of dimethyl disulphide, and related reactions", Journal of the Chemical Society, Perkin Transactions 1, 1976, No. 5, pp. 525-532.
Haszeldine, "Perfluoroalkyl derivatives of sulfur.XI. Reaction of polyfluoromonoiodoalkanes with dimethyl disulfide," Journal of the Chemical Society, Perkin Transactions 1, 1972, XP009521166, pp. 155-159.

(Continued)

*Primary Examiner* — James C Goloboy
(74) *Attorney, Agent, or Firm* — Jeffrey M. Olofson

(57) ABSTRACT

A deposition composition includes a solvent comprising a hydrofluorothioether compound represented by the following general formula (I): Rf—S—Rh where Rf is a fluorinated or perfluorinated group having 2-9 carbon atoms and optionally includes one or more catenated heteroatoms or chlorine atoms, and Rh is a non-fluorinated hydrocarbon group having 1-3 carbon atoms. The deposition composition further includes a coating material that is soluble or dispersible in said solvent.

15 Claims, No Drawings

(56) References Cited

OTHER PUBLICATIONS

Haszeldine, "Perfluoroalkyl Derivatives of Sulphur. PartXI. The Reaction of Poly-fluoromonoiodoalkanes with Dimethyl Disulphide", Journal of the Chemical Society, Perkin Transactions 1, 1972, pp. 159-161, XP009521167A.
International Search Report for PCT International Application No. PCT/IB2021/050463, dated Jun. 24, 2021, 5 pages.
Nguyen, "Reaction of perfluoroalkyl carbanions with thiocyanates. Synthesis of fluorinated sulfides and sulfenyl chlorides", Journal of Organic Chemistry, Apr. 1981, vol. 46, No. 9, pp. 1938-1940.
Snegirev, "Reaction of perfluoro-2-methyl-2-pentene with bifunctional mucleophiles", Bulletin of the Academy of Sciences of the USSR Division of Chemical Science, Russian Chemical Bulletin, 1985, vol. 34, No. 9, pp. 1906-1915.
Tordeux, "Reactions of Bromotrifluoromethane and Related Halides Part VII [1] Condensations with Thiocyanates and Isocyanates in the Presence of Zinc", Journal of Fluorine Chemistry, Jun. 1989, vol. 43, No. 1, pp. 27-34.

\* cited by examiner

DEPOSITION COMPOSITIONS AND METHODS OF MAKING AND USING SAME

CROSS REFERENCE TO RELATED APPLICATIONS

This application is a national stage filing under 35 U.S.C. 371 of PCT/IB2021/050463, filed Jan. 21, 2021, which claims the benefit of U.S. Provisional Application No. 62/967,057, filed Jan. 29, 2020, the disclosure of which is incorporated by reference in its/their entirety herein.

FIELD

The present disclosure relates to deposition solvent or carrier solvent solutions and methods for coating substrates using same.

BACKGROUND

Various deposition solvent or carrier solvent solutions are described in, for example, U.S. Pat. Nos. 7,691,282, 6,403,149, and 5,049,410.

DETAILED DESCRIPTION

In deposition solvent or carrier solvent applications, a solute is dissolved, emulsified, suspended, or otherwise disposed in a solvent to form a solution. The solution is then applied to a substrate, before evaporating or otherwise removing the solvent, leaving the solute on the substrate (e.g., in the form of a thin film or coating). Application of the solution to the substrate may be carried out using many techniques including dip or drain coating, spin coating, spray coating, or roll-to-roll coating. The solvents used for these applications and techniques require a balance of properties including:
- Solubility for deposited material/solute
- Ability to wet substrate to be coated—low surface tension and low viscosity of solvent and solution
- Complete evaporation from substrate—no solvent residue left behind
- Material compatibility—solvent needs to be compatible with the solute, the substrate, and the materials used in the solution preparation and deposition processes
- Stability—solvent needs to be stable under the solution preparation and use conditions
- Safety—the solvent should be non-toxic/low toxicity and non-flammable
- Environmentally friendly—the solvent should have a short atmospheric lifetime, low global warming potential (GWP), and no ozone depletion potential (ODP)

Solvent blends can be an option in some cases where a solvent—typically a fluorinated solvent—has the desired properties for deposition but lacks sufficient solubility for the solute. In such cases, the solvent may be blended with an organic solvent having higher affinity for the solute, but that, by itself, does not have the desired properties of a deposition solvent. Some examples of these co-solvents include alcohols including isopropanol, and trans-1,2-dichloroethylene. These systems can be made to work in some cases, but such solvent blends have several drawbacks including:
- Shifting composition upon natural evaporation from the bath affecting performance properties including solubility of the solute (e.g., natural evaporation of one component from the mixture will impart a change in properties relative to the solution), safety, and quality of the deposited solute film (e.g., if the ratio of the solvent blend changes, then the solubility of the solute in the solvent blend will change, which will affect the amount of solute absorbed onto the substrate).
- Potential material compatibility issues with the added solvent(s)
- Environmental regulations on added solvent(s)
- Increased solubility for other undesirable solutes Consequently, single solvent solutions that can meet the balance of property requirements outlined above for a wide variety of solutes are desirable.

Generally, the present application is directed to use of certain hydrofluorothioethers as deposition solvents or carrier solvents. Surprisingly, it has been discovered that such hydrofluorothioethers have strong solubility for several key solutes including perfluoropolyether (PFPE) lubricants, silicones, and fluoropolymers, while also providing of balance of properties that satisfy most if not all of the requirements outlined above. The excellent wetting properties of these solvents combined with their environmental, physical, and safety properties in a single solvent system make them ideal for use in a multitude of applications.

As used herein, "fluoro-" (for example, in reference to a group or moiety, such as in the case of "fluoroalkylene" or "fluoroalkyl" or "fluorocarbon") or "fluorinated" means partially fluorinated such that there is at least one carbon-bonded hydrogen atom As used herein, "perfluoro-" (for example, in reference to a group or moiety, such as in the case of "perfluoroalkylene" or "perfluoroalkyl" or "perfluorocarbon") or "perfluorinated" means completely fluorinated such that, except as may be otherwise indicated, there are no carbon-bonded hydrogen atoms replaceable with fluorine.

As used herein, the singular forms "a", "an", and "the" include plural referents unless the content clearly dictates otherwise. As used in this specification and the appended embodiments, the term "or" is generally employed in its sense including "and/or" unless the content clearly dictates otherwise.

As used herein, the recitation of numerical ranges by endpoints includes all numbers subsumed within that range (e.g. 1 to 5 includes 1, 1.5, 2, 2.75, 3, 3.8, 4, and 5).

Unless otherwise indicated, all numbers expressing quantities or ingredients, measurement of properties and so forth used in the specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

In some embodiments, the present disclosure is directed to deposition compositions that include one or more hydrofluorothioether compounds and a solute (or material that is otherwise dispersed in the hydrofluorothioether and intended for deposition onto a substrate).

In some embodiments, suitable hydrofluorothioethers are represented by the following structural formula (I):

$$Rf\text{—}S\text{—}Rh \tag{I}$$

In some embodiments, Rf is a partially fluorinated or perfluorinated group having 2 to 9, 2 to 6, 2 to 5, or 2 to 4 carbon atoms that is saturated or unsaturated, linear or branched, acyclic or cyclic, and optionally includes one or more catenated heteroatoms, chlorine atoms, or bromine atoms. In some embodiments, Rf is partially fluorinated. In some embodiments, Rf has no more than two hydrogen atoms. In some embodiments, Rf is perfluorinated. In some embodiments, Rf is a perfluorinated, saturated, branched group having 3 to 6 carbon atoms.

In some embodiments, Rh is a non-fluorinated hydrocarbon group having 1-3 or 1-2 carbon atoms that is saturated or unsaturated, linear or branched, and optionally includes one or more catenated heteroatoms. In some embodiments, Rh is $CH_3$ or $CH_3CH_2$. In some embodiments, Rh is $CH_3$.

In some embodiments, suitable hydrofluorothioethers are represented by the following structural formula (II):

(II)

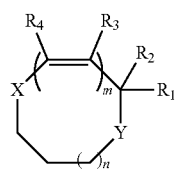

In some embodiments, n is 0 or 1; m is 0 or 1; X is an oxygen atom or a sulfur atom and Y is an oxygen atom or a sulfur atom with the proviso X and Y are not both oxygen atoms; and $R_1$, $R_2$, $R_3$, and $R_4$ are, independently, a fluorine atom, or a partially fluorinated or perfluorinated group having 1 to 4 or 1 to 3 carbon atoms that are saturated or unsaturated, linear or branched, acyclic or cyclic, and optionally includes one or more catenated heteroatoms, chlorine atoms, or bromine atoms. In some embodiments, at least one $R_1$, $R_2$, $R_3$, and $R_4$ is a partially fluorinated group having 1 to 4 carbon atoms. In some embodiments, $R_1$, $R_2$, $R_3$, and $R_4$ are, independently, a fluorine atom or a perfluorinated group having 1 to 4 carbon atoms. In some embodiments, none of $R_1$, $R_2$, $R_3$, and $R_4$ have more than two hydrogen atoms.

In some embodiments, any of the above discussed catenated heteroatoms may be secondary O heteroatoms wherein the O is bonded to two carbon atoms. In some embodiments, any of the above discussed catenated heteroatoms may be tertiary N heteroatoms wherein the N is bonded to three carbon atoms.

In some embodiments, the fluorine content in the hydrofluorothioether compounds of the present disclosure may be sufficient to make the compounds non-flammable according to ASTM D-3278-96 e-1 test method ("Flash Point of Liquids by Small Scale Closed Cup Apparatus").

In various embodiments, representative examples of the compounds of general formula (I) include the following:

$CF_3CF_2$—S—$CH_3$, $HCF_2CF_2$—S—$CH_3$, $HCFClCF_2$—S—$CH_3$, $CF_2ClCF_2$—S—$CH_3$, $CF_3CFCl$—S—$CH_3$, $CF_3CF_2CF_2$—S—$CH_3$, $CF_3OCF_2CF_2$—S—$CH_3$, $CF_3CHFCF_2$—S—$CH_3$, $(CF_3)_2CF$—S—$CH_3$, $(CF_3)_2CF$—S—$CH_2Cl$, $CF_3CF_2CF_2CF_2$—S—$CH_3$, $(CF_3)_2CFCF_2$—S—$CH_3$, $CF_3CF_2CF(CF_3)$—S—$CH_3$, $CF_3OCF_2CF_2CF_2$—S—$CH_3$, $CF_3CF_2CF_2CF_2$—S—$CH_2CH_3$, $CF_3CF_2CF_2CF_2$—S—$CH_2OCH_3$, $CF_3CF_2CF(CF_3)$—S—$CH_2CH_3$, $(CF_3)_2NCF_2$—S—$CH_3$,

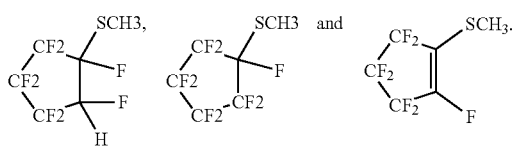

In various embodiments, representative examples of the compounds of general formula (II) include the following:

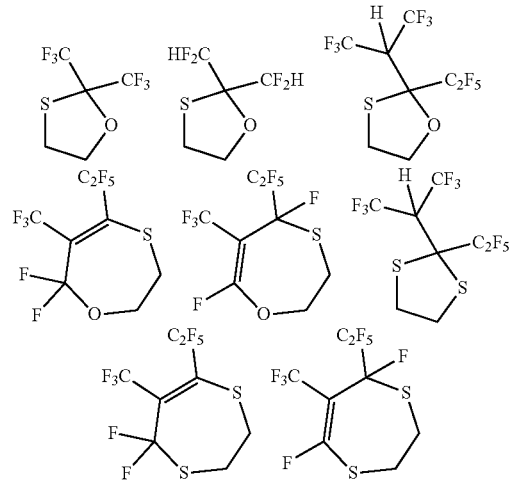

In some embodiments, the hydrofluorothioethers of the present disclosure may be synthesized in a one-step process by the reaction of i) perfluoroalkyl iodide with dialkyl sulfide or dialkyl disulfide and alkali metal alkanethiolate under UV or thermal conditions as disclosed in U.S. Pat. No. 3,816,277; or ii) perfluoroalkyl anion generated from perfluoroalkenes and a metal fluoride (MF) or Rf—I or Rf—Br with Rh—SCN as disclosed in J. Org. Chem., 1981, 46 (9), 1938; In some embodiments, the hydrofluorothioethers of the present disclosure may be synthesized in a two-step process by the reaction of a perfluorinated olefin with sulfur in the catalytic amount of MF to form a cyclic dithietane (e.g. as disclosed in J. Org. Chem., 1982, 47 (2), 377), followed by alkylation with a suitable alkylating reagent (e.g. as disclosed in *Izvestlya Akademii Nauk SSSR, Seriya Khimicheskaya* 1989, 6, 1380-3).

In some embodiments, the hydrofluorothioethers of the present disclosure may be synthesized via the methods described in U.S. Pat. No. 3,749,794 and/or Russ. Chem. Bull., 1985, 34, 1906, which is herein incorporated by reference in its entirety.

In some embodiments, one or more of the above-described hydrofluorothioether compounds may be provided in the deposition compositions in an amount of at least 50 wt. %, at least 70 wt. %, at least 90 wt. %; at least 95 wt. %, or at least 99 wt. %, based on the total weight of the composition. In some embodiments, the deposition compositions may also include one or more additional solvents (for example, ethers, alkanes, alkenes, perfluorocarbons, perfluorinated tertiary amines, perfluoroethers, cycloalkanes, esters, ketones, aromatics, siloxanes, hydrochlorocarbons, hydrochlorofluorocarbons, hydrofluorocarbons, and the like, and mixtures thereof). Such co-solvents are preferably at least partially fluorinated, and can be chosen to modify or enhance the properties of a composition for a particular use, and can be utilized in ratios (of co-solvent(s) to hydrofluorothioether (s)) such that the resulting composition preferably has no flash point. For example, such additional solvents may be present in the deposition composition, but may be present in an amount of less than 10 wt. %, less than 5 wt. %, or less than 1 wt. %, based on the total weight of the deposition composition. In some embodiments, the deposition compositions may consist essentially of one or more of the above-described hydrofluorothioether compounds and one or more solutes. For each application, minor amounts of optional components can be added to the compounds to impart particular desired properties for particular uses. Useful compositions can comprise conventional additives such as, for example, surfactants, coloring agents, stabilizers, anti-oxidants, flame retardants, and the like, and mixtures thereof.

In some embodiments, the hydrofluorothioether compounds may have a low environmental impact. In this regard, the hydrofluorothioether compounds of the present disclosure may have a global warming potential (GWP) of less than 500, 300, 200, 100, 10, or less than 1. As used herein, GWP is a relative measure of the global warming potential of a compound based on the structure of the compound. The GWP of a compound, as defined by the Intergovernmental Panel on Climate Change (IPCC) in 1990 and updated in 2007, is calculated as the warming due to the release of 1 kilogram of a compound relative to the warming due to the release of 1 kilogram of $CO_2$ over a specified integration time horizon (ITH).

$$GWP_i(t') = \frac{\int_0^{ITH} a_i[C(t)]dt}{\int_0^{ITH} a_{CO_2}[C_{CO_2}(t)]dt} = \frac{\int_0^{ITH} a_i C_{oi} e^{-t/\tau_i} dt}{\int_0^{ITH} a_{CO_2}[C_{CO_2}(t)]dt}$$

In this equation $a_i$ is the radiative forcing per unit mass increase of a compound in the atmosphere (the change in the flux of radiation through the atmosphere due to the IR absorbance of that compound), C is the atmospheric concentration of a compound, $\tau$ is the atmospheric lifetime of a compound, t is time, and i is the compound of interest. The commonly accepted ITH is 100 years representing a compromise between short-term effects (20 years) and longer-term effects (500 years or longer). The concentration of an organic compound, i, in the atmosphere is assumed to follow pseudo first order kinetics (i.e., exponential decay). The concentration of $CO_2$ over that same time interval incorporates a more complex model for the exchange and removal of $CO_2$ from the atmosphere (the Bern carbon cycle model).

In some embodiments, the hydrofluorothioethers of the present disclosure may have an ozone depletion potential (ODP) of zero or near zero.

In some embodiments, the hydrofluorothioethers provide excellent wettability including low surface tension and low viscosity. In some embodiments, the surface tension of the hydrofluorothioether may be less than 25 dyne per centimeter (dyn/cm), or less than 20 dyn/cm, or less than 15 dyn/cm. In some embodiments, the viscosity of the hydrofluorothioether may be less than 2 centipoise (cps), or less than 1 cps.

In some embodiments, the hydrofluorothioethers evaporate uniformly and completely off the substrate after the deposition process. Evaporation of the solvent is controlled by the boiling point and heat of vaporization of the solvent. In some embodiments, the boiling point of the hydrofluorothioether is less than 150 degrees Celsius (° C.), less than 130° C., less than 100° C. or less than 80° C. In some embodiments, the heat of vaporization of the hydrofluorothioether is less than 50 calories per gram (cal/g), less than 40 cal/g, less than 35 cal/g, or less than 30 cal/g.

In various embodiments, the solutes of the deposition compositions (or materials that are otherwise dispersed in the deposition compositions and intended for deposition onto a substrate) may include pigments, lubricants, stabilizers, adhesives, anti-oxidants, dyes, polymers, pharmaceuticals, document preservation materials (for example, alkaline materials used in the deacidification of paper), release agents, inorganic oxides, and the like, and combinations thereof. For example, coating materials may include any one or combination of perfluoropolyethers, hydrocarbons, silicone lubricants, polymers or copolymers of various fluorocarbon or perfluorocarbon monomers (e.g., tetrafluoroethylene, vinylidenedifluoride, fluorinated acrylates) or combinations thereof. Further examples of suitable coating materials include titanium dioxide, iron oxides, magnesium oxide, polysiloxanes, stearic acid, acrylic adhesives, or combinations thereof.

In some embodiments, the deposition compositions may include 0.001 to 10 weight percent, 0.1 to 10 weight percent, or 0.1 to 5 weight percent, of any one or combination of the above-described solutes, based on the total weight of the deposition composition.

Particular applications for the deposition compositions of the present disclosure include disc lube in the hard disk drive industry (PFPE lubricants), needle deposition in the medical industry (silicones), and deposition of fluoropolymer coatings for electrical components including printed circuit board assemblies (PCBA) and sensors. Other applications include carrier solvent for fingerprint developer or particle deposition.

Further regarding the disc lube application, in a hard disk drive, information is stored in a magnetic layer on a disk (also called the media). This magnetic layer is protected by a diamond like carbon (DLC) layer and a lubricant. The information in the magnetic layer on the media is read using sensors in a head that "flies" over the media as the media rotates. To improve the density of information stored on the media, one of the key parameters is the separation between the magnetic layer on the media and the sensor on the head.

The thickness of the DLC and lubricant layers along with the fly height of the head determine this separation. The lubricants typically used are functionalized perfluoropolyethers (PFPE). The PFPE polymer is typically linear. An alcohol is a common functional group. Z-Dol (available from Solvay) has two alcohol groups and was used as a lubricant by the HDD industry for many years:

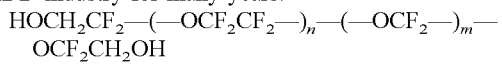

Where the ratio of n to m is about 1 and the molecular weight can range from 1000 to 6000. To reduce the separation between the media magnetic layer and the head sensor along with other performance needs, new lubricants are being introduced. Some examples of these include Z-Tetraol (available from Solvay) with 4 alcohol groups:

And ZTMD (Journal of Applied Physics 100, 044306 (2006)) with 8 alcohol groups

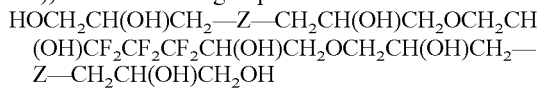

Where Z is —OCH2CF2O—(—CF2CF2O-)n-(—CF2O-)m-CF2CH2O—. PFPE lubricants with 6 alcohol groups along with molecules with other polar groups are also being evaluated. As the polarity of the lubricants used by the HDD industry increase, finding a solvent to meet the performance requirements has become difficult. While there are no commercially available single solvent solutions for ZTMD, the present hydrofluorothioethers provide such a single solvent solution given their solubility for highly polar lubricants and other properties that satisfy the previously mentioned deposition solvent requirements.

In some embodiments, the above-described deposition compositions can be useful in depositing films or coatings, where the hydrofluorothioethers function as a carrier for a coating material (also referred to herein as a solute) to enable deposition of the material on the surface of a substrate. In this regard, the present disclosure further relates to a process for depositing a coating on a substrate surface using the deposition compositions of the present disclosure. The process comprises the step of applying to at least a portion of at least one surface of a substrate a coating of a deposition composition comprising (a) a solvent composition that includes one or more hydrofluorothioethers compounds as described above; and (b) one or more coating materials which are soluble or otherwise dispersible in the solvent composition, and optionally any of the above described co-dispersants, co-solvents, or more additives. The coating can be of any desired thickness, and, in practice, the thickness will be determined by such factors as the viscosity of the coating material, the temperature at which the deposition composition is applied, and the rate of withdrawal (if immersion is utilized). In illustrative embodiments, the deposition process of the disclosure can be carried out by applying the deposition composition to a substrate by any conventional technique. For example, the composition can be brushed or sprayed (e.g., as an aerosol) onto the substrate, or the substrate can be spin-coated. In some embodiments, the substrate may be coated by immersion in the composition. Immersion can be carried out at any suitable temperature and can be maintained for any convenient length of time. If the substrate is a tubing, such as a catheter, and it is desired to ensure that the composition coats the lumen wall, the composition may be drawn into the lumen by the application of reduced pressure.

The process may further include the step of removing the solvent composition from the coating by, e.g., allowing evaporation (which can be aided by the application of, e.g., heat or vacuum).

Both organic and inorganic substrates can be coated by the processes of the present disclosure. Representative examples of the substrates include metals, ceramics, glass, polycarbonate, polystyrene, acrylonitrile-butadiene-styrene copolymer, natural fibers (and fabrics derived therefrom) such as cotton, silk, fur, suede, leather, linen, and wool, synthetic fibers (and fabrics) such as polyester, rayon, acrylics, nylon, or blends thereof, fabrics including a blend of natural and synthetic fibers, and composites of the foregoing materials. In some embodiments, substrates that may be coated include, for example, magnetic hard disks with perfluoropolyether lubricants, medical devices with silicone lubricants, or electrical connectors with copolymers of various fluorocarbon or perfluorocarbon monomers.

Another aspect of the present disclosure provides a method of lubricating a substrate. The method comprises applying a coating of a lubricant composition to a substrate followed by removing the solvent from the coating to form a neat lubricant film. The lubricant composition may include 0.001 to 10 wt. % perfluoropolyether lubricant or silicone lubricant and about 90.0 to about 99.99 weight percent of one or more of the above-described hydrofluorothioether compounds, based on the weight of the lubricant composition. The hydrofluorothioether solvent may then be removed during a drying step. The substrate may be magnetic media including, for example, thin films and hard disks, or a medical device. The magnetic media may include a base layer such as glass, aluminum or a polymeric material and a magnetic layer containing iron, cobalt, nickel, or the like. The magnetic media can contain optional layers of carbon or other materials to enhance, for example, durability and performance of the media. The lubricant may be applied as the outermost layer.

EXAMPLES

Objects and advantages of this disclosure are further illustrated by the following comparative and illustrative examples. Unless otherwise noted, all parts, percentages, ratios, etc. in the examples and the rest of the specification are by weight, and all reagents used in the examples were obtained, or are available, from general chemical suppliers such as, for example, Sigma-Aldrich Corp., Saint Louis, MO, US or may be synthesized by conventional methods. The following abbreviations are used herein: mL=milliliters, L=liters, mol=moles, mmol=millimoles, min=minutes, h=hours, g=grams, ° C.=degrees Celsius.

Sample Preparation

TABLE 1

| Materials | | |
|---|---|---|
| Material | Description | Source |
| FOMBLIN Z-Tetraol | Perfluoropolyether lubricant | Solvay, Brussels, Belgium |
| ZTMD | Perfluoropolyether lubricant | Exfluor Research Corp, Round Rock, TX, US |
| Sulfur | Sulfur powder | Alfa Aesar, Haverhill, MA, US |
| KF | Potassium Fluoride | Sigma-Aldrich Corp., Saint Louis, MO, US |
| DMF | N,N-Dimethylformamide | Alfa Aesar, Haverhill, MA, US |

TABLE 1-continued

Materials

| Material | Description | Source |
|---|---|---|
| HFP | Hexafluoropropene | Oakwood Chemical, Estill, SC, US |
| PSF-20cSt | Silicone Fluid | Clearco, Willowgrove, PA, US |
| PSF-100cSt | Silicone Fluid | Clearco, Willowgrove, PA, US |
| PSF-350cSt | Silicone Fluid | Clearco, Willowgrove, PA, US |
| PSF-1,000cSt | Silicone Fluid | Clearco, Willowgrove, PA, US |
| PSF-12,500cSt | Silicone Fluid | Clearco, Willowgrove, PA, US |
| KRYTOX K-6 | Perfluoropolyether lubricant | Chemours, Wilmington, DE, US |
| Comparative Example CE1 | NOVEC 7100DL | 3M Company, Maplewood, MN, US |
| Comparative Example CE2 | VERTREL XF | Chemours, Wilmington, DE, US |

Preparation of Example 1: Perfluoroisopropyl Methyl Thioether (PFIPTE) $(CF_3)_2CFSCH_3$ To a dry 600 mL Hastalloy Parr reactor was added sublimed sulfur (36 g, 1.1 mol), anhydrous spray dried potassium fluoride (15 g, 260 mmol) and anhydrous N,N-dimethylformamide (300 mL). The reactor was sealed and the contents were heated to 60° C. with stirring. Once the reactor stabilized at this temperature, hexafluoropropene (150 g, 1.0 mol) was added at a rate of 6 g/min, maintaining the temperature below 65° C. When addition was complete, the reaction was stirred for 1 h at 60° C. before being cooled to ambient temperature. The resulting slurry was transferred to a 2L round bottom flask to accommodate the addition of remaining reagents. Potassium fluoride (116 g, 2.0 mol) was added in a single portion, followed by dimethyl sulfate (104 mL, 1.1 mol) which was added via an addition funnel at a rate to maintain an internal reaction temperature below ° C. Once the addition was complete the resulting reaction was stirred for 12 hours at ambient temperature. The heterogeneous solution was then filtered to remove solids, then washed 3 times with an equal volume of water. The lower phase was collected, dried over magnesium sulfate and filtered. The crude material was collected as a pale yellow oil (117 g, 93% desired product by GC-fid). This material was purified by distillation at ambient pressure to give the perfluoroisopropyl methyl thioether (98 g, 45% yield, boiling point=65° C.).

Solubility

Solubility of Z-Tetraol and ZTMD lubricants in PFIPTE (Example 1) and Comparative Examples CE1 and CE2 was determined at room temperature as follows. A glass vial having a PTFE lined cap was weighed to 4 decimal places using a standard laboratory balance. Lubricant was added to the vial and the mass was recorded. Solvent was then added to the vial dropwise or in increments until the lubricant was completely solubilized in the solvent. Once the lubricant was dissolved, the gross weight of the container was measured, the mass of the solvent was determined by subtracting the weights of the vial and the lubricant, and the weight percentage of lubricant was calculated as the amount of lubricant divided by the total weight of lubricant and solvent. Solubility was determined as the maximum value of the weight percentage of lubricant for which the lubricant completely solubilized in the solvent. Results are presented in Table 2.

TABLE 2

Solubility Results at Room Temperature

| Solvent | Solubility of Z-Tetraol (wt %) | Solubility of ZTMD (wt %) |
|---|---|---|
| Example 1 | >10% | 0.75% |
| CE1 | 0.3% | <0.1% |
| CE2 | >10% | 0.3% |

Solubility of silicone and fluoropolymer lubricants in PFIPTE (Example 1) and Comparative Examples CE1 and CE3 was determined at room temperature as follows. An empty vial was placed on a standard laboratory balance and tared. Solvent was added to the vial and the weight recorded. The desired lubricant solute was added to the vial and the mass of the solute was recorded. The vial was sealed, agitated and the solubility observed. If the solute completely dissolved, additional solute was added, and the mass recorded, repeating the above steps. Addition of solute continued until the solute was no longer soluble or the solubility was greater than 75% by weight. Solubility was determined as a weight percentage of lubricant to the total weight of lubricant and solvent.

TABLE 3

Solubility at Room Temperature

| Solute | Solubility in Example 1 (wt%) | Solubility in CE1 (wt %) | Solubility in CE2 (wt %) |
|---|---|---|---|
| PSF-20cSt | >75% | 0.3 wt % | <0.3 wt % |
| PSF-100cSt | >75% | <0.3 wt % | <0.3 wt % |
| PSF-350cSt | >75% | <0.3 wt % | <0.3 wt % |
| PSF-1,000cSt | >75% | <0.3 wt % | <0.3 wt % |
| PSF-12,500cSt | >75% | <0.3 wt % | <0.3 wt % |
| K-6 | >75% | >75% | >75% |

Physical Properties

The boiling point and vapor pressure for Example 1 was determined using the procedures in ASTM E1719-97 "Standard Test Method for Vapor Pressure of Liquids by Ebulliometry." First, vapor pressure was measured, then the boiling point was calculated as described in section 10 of ASTM method E1719-97.

Heat of vaporization for Example 1 was calculated using the vapor pressure data and the Clausius-Clapeyron equation.

Density was measured using a Rudolph DDM PLUS automatic density meter. Kinematic viscosity was determined in accordance with ASTM D445-94e1 "Standard Test Method for Kinematic Viscosity of Transparent and Opaque Liquids (the Calculation of Dynamic Viscosity)", except the bath temperature was controlled to ±0.1° C., using a Visco-System AVS 350 viscosity timer (Schott Instruments GmbH, Hattenbergstraße 10 55122 Mainz Germany) and Hagenbach-corrected 545-03, 545-13 or 545-20 Ubbelohde viscometers (Cannon Instruments Company, Box 812, State College, PA, US). For temperatures below 0° C., a Lawler temperature control bath was used. Viscosity was calculated by multiplying the kinematic viscosity by the density.

Surface tension was determined using a K100C force tensiometer (available from KRÜSS, Hamburg, Germany) at 24° C. The method used the Wilhelmy plate method according to ASTM D1331-14, "Standard Test Methods for Surface and Interfacial Tension of Solutions of Paints, Solvents, Solutions of Surface-Active Agents, and Related Materials." Samples were tested in duplicate and presented as an average of the two measurements.

The atmospheric lifetime of each test material was determined from relative rate studies utilizing chloromethane ($CH_3Cl$) as a reference compound. The pseudo-first order reaction rates of the reference compound and the test compound with hydroxyl radicals (·OH) was determined in a laboratory chamber system. The atmospheric lifetime of the reference compound is documented in the literature. Based on this value and the pseudo-first order rates measured in the chamber experiments, the atmospheric lifetime for each specimen was calculated from the reaction rates for the test compound relative to the reference compounds and the reported lifetime of the reference compounds as shown below:

$$\tau_x = \tau_r \cdot \frac{k_r}{k_x}$$

where $\tau_x$ is the atmospheric lifetime of test material, $\tau_r$ is the atmospheric lifetime of the reference compound, and $k_x$ and $k_r$ are the rate constants for the reaction of hydroxyl radical with test material and the reference compound, respectively. The concentrations of gases in the test chamber were quantified by Fourier transform infrared spectroscopy (FTIR). The measured atmospheric lifetime value of each fluid was subsequently used for the GWP calculation.

Global Warming Potential (GWP) values were calculated using methods described in the Intergovernmental Panel on Climate Change (IPCC) Fifth Assessment Report (AR5). A gas standard of the material to be assessed, having a known and documented concentration, was prepared and used to obtain quantitative FTIR spectra of this compound. Quantitative gas phase, single component FTIR library reference spectra were generated at two different concentration levels by diluting the sample standard with nitrogen using mass flow controllers. The flow rates were measured using certified BIOS DRYCAL flow meters (Mesa Labs, Butler, NJ, US) at the FTIR cell exhaust. The dilution procedure was also verified using a certified ethylene calibration gas cylinder. Using methods described in AR5, the FTIR data were used to calculate the radiative efficiency, which in turn was combined with the atmospheric lifetime to calculate the GWP value.

Flash points were measured according to the procedures outlined in ASTM D-3278-96 e-1 "Standard Test Methods for Flash Point of Liquids by Small Scale Closed-Cup Apparatus." Materials that demonstrated no flash point were considered to be non-flammable according to the ASTM test method.

The physical properties of Example 1 and Comparative Examples CE1 and CE2 are summarized in Table 4. Example 1 has evaporation (boiling point and heat of vaporization) and deposition (density, surface tension and viscosity) properties on par with CE1 and CE2, while having significantly lower GWP and improved solubility for solutes of interest (see Tables 2 and 3).

TABLE 4

Properties at Room Temperature

| Property | Example 1 | CE1[1] | CE2[2] |
|---|---|---|---|
| Boiling Point (° C.) | 62 | 61 | 55 |
| Vapor Pressure (mm Hg) | 186 | 202 | 226 |

TABLE 4-continued

Properties at Room Temperature

| Property | Example 1 | CE1[1] | CE2[2] |
|---|---|---|---|
| Heat of Vaporization at Boiling Point (cal/g) | 35 | 27 | 31 |
| Density (g/mL) | 1.47 | 1.52 | 1.58 |
| Surface Tension (dyn/cm) | 15.6 | 13.6 | 14.1 |
| Viscosity (cps) | 0.78 | 0.58 | 0.67 |
| GWP | <1 | 320 | 1650 |
| Flash Point | None | None | None |

[1]Data from 3M NOVEC 7100DL Engineered Fluid Product Information sheet
[2]Data from Chemours VERTREL XF Technical Information sheet Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows. All references cited in this disclosure are herein incorporated by reference in their entirety.

What is claimed is:

1. A deposition composition comprising:
   a solvent comprising a hydrofluorothioether represented by the following structural formula (I):

Rf—S—Rh (I)

where Rf is a perfluorinated group having 2-9 carbon atoms and optionally includes one or more catenated heteroatoms or chlorine atoms, and Rh is a non-fluorinated hydrocarbon group having 1-3 carbon atoms; and
   a coating material that is soluble or dispersible in said solvent, wherein said coating material comprises a pigment, lubricant, stabilizer, adhesive, anti-oxidant, dye, polymer, pharmaceutical, release agent, or inorganic oxide.

2. The deposition composition of claim 1, wherein said coating material comprises a perfluoropolyether, a hydrocarbon, a silicone lubricant, a fluorinated acrylate polymer, or polymer or copolymer of a fluorocarbon or perfluorocarbon monomer.

3. The deposition composition of claim 1, wherein Rf is a perfluorinated, saturated group having 2-5 carbon atoms.

4. The deposition composition of claim 1, wherein Rh is $CH_3$ or $CH_3CH_2$.

5. The deposition composition of claim 1, wherein the compound having structural formula (I) is present in the deposition composition in an amount of at least 70% by weight, based on the total weight of the deposition composition.

6. A method of depositing a coating onto a substrate, the method comprising:
   (a) applying to a substrate a coating of the deposition composition according to claim 1; and
   (b) removing the hydrofluorothioether from the coating.

7. The method of claim 6, wherein the substrate is a magnetic hard disk, electrical connector, or medical device.

8. A lubricant composition comprising a hydrofluorothioether represented by the following structural formula (I):

Rf—S—Rh (I)

where Rf is a perfluorinated group having 2-9 carbon atoms and optionally includes one or more catenated heteroatoms or chlorine atoms, and Rh is a non-fluorinated hydrocarbon group having 1-3 carbon atoms; and a lubricant soluble or dispersible in the hydrofluorothioether.

9. The lubricant composition of claim 8, comprising:
(a) 0.001 to 10 wt. % perfluoropolyether lubricant; and
(b) 90 to about 99.999 wt. % of the hydrofluorothioether, based on the total weight of the lubricant composition.

10. The lubricant composition of claim 9, wherein the perfluoropolyether lubricant comprises a perfluoropolyether compound having polar groups.

11. The lubricant composition of claim 10, wherein the polar groups comprise alcohol groups.

12. The lubricant composition of claim 11, wherein the polar groups comprise at least 4 alcohol groups.

13. A method of lubricating a substrate comprising:
(a) applying to a substrate a coating of a lubricant composition according to claim 8; and
(b) removing the hydrofluorothioether from the coating.

14. The method of claim 13, wherein the substrate is magnetic media.

15. A deposition composition comprising:
a solvent comprising a hydrofluorothioether represented by the following structural formula (II):

(II)

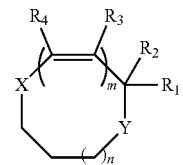

II where n is 0 or 1; m is 0 or 1; X is an oxygen atom or a sulfur atom and Y is an oxygen atom or a sulfur atom, with the proviso X and Y are not both oxygen atoms; and $R_1$, $R_2$, $R_3$, and $R_4$ are, independently, a fluorine atom, or a partially fluorinated or perfluorinated group having 1 to 4 carbon atoms and optionally includes one or more catenated heteroatoms, chlorine atoms, or bromine atoms; and a coating material that is soluble or dispersible in said solvent.

* * * * *